United States Patent
Lobastov et al.

(10) Patent No.: US 11,413,698 B2
(45) Date of Patent: Aug. 16, 2022

(54) SYSTEM AND METHOD FOR MONITORING AND CONTROLLING BUILD QUALITY DURING ELECTRON BEAM MANUFACTURING

(71) Applicant: General Electric Company, Schenectady, NY (US)

(72) Inventors: Vladimir Anatolievich Lobastov, Waterford, NY (US); Vincent Scott Smentkowski, Clifton Park, NY (US); John Scott Price, Niskayuna, NY (US); Vance Scott Robinson, South Jordan, UT (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 72 days.

(21) Appl. No.: 15/919,771

(22) Filed: Mar. 13, 2018

(65) Prior Publication Data
US 2019/0283169 A1    Sep. 19, 2019

(51) Int. Cl.
*B23K 15/00*    (2006.01)
*B33Y 10/00*    (2015.01)
(Continued)

(52) U.S. Cl.
CPC ........ *B23K 15/0086* (2013.01); *B23K 15/002* (2013.01); *B23K 15/004* (2013.01);
(Continued)

(58) Field of Classification Search
CPC ............ B23K 15/0086; B23K 15/0006; B23K 15/002; B23K 15/02; B23K 15/004; B23K 15/0013
(Continued)

(56) References Cited

U.S. PATENT DOCUMENTS 3,329,813 A * 7/1967 Hashimoto .......... G01N 23/203
850/63
6,690,010 B1 * 2/2004 Adler ................. G01N 23/2251
250/305
(Continued)

FOREIGN PATENT DOCUMENTS

EP    2259912 B1    2/2012
WO    2015120047 A1    8/2015

OTHER PUBLICATIONS

Everton et al., "Review of in-situ process monitoring and in-situ metrology for metal additive manufacturing", Materials & Design, vol. 95, pp. 431-445, Apr. 5, 2016.
(Continued)

*Primary Examiner* — Thien S Tran
(74) *Attorney, Agent, or Firm* — Dority & Manning, P.A.

(57) ABSTRACT

A system and method for monitoring and controlling build quality during electron beam manufacturing of a build part. The system may include at least one electron beam source to direct at least one electron beam onto a plurality of deposited layers of metallic powder to form a melt pool, a detector to detect in real-time backscattered energy ejected from the melt pool and indicative of a defect in the build part and generate a detection signal representative of the defect. A controller receives and analyzes the detection signal and generates a corrective signal for control of at least one of the actuator and the at least one electron beam source to direct the at least one electron beam onto the plurality of deposited layers of metallic powder to sequentially consolidate patterned portions of the plurality of deposited metallic powder layers to adaptively form the three-dimensional build part.

20 Claims, 6 Drawing Sheets

(51) Int. Cl.
 *B33Y 30/00* (2015.01)
 *B33Y 50/02* (2015.01)
 *B23K 15/02* (2006.01)

(52) U.S. Cl.
 CPC ...... *B23K 15/0006* (2013.01); *B23K 15/0013* (2013.01); *B23K 15/02* (2013.01); *B33Y 10/00* (2014.12); *B33Y 30/00* (2014.12); *B33Y 50/02* (2014.12)

(58) Field of Classification Search
 USPC .............................. 219/74, 76.12, 76.14, 603
 See application file for complete search history.

(56) References Cited

U.S. PATENT DOCUMENTS

| | | | |
|---|---|---|---|
| 8,809,780 | B2 | 8/2014 | Wollenhaupt et al. |
| 9,079,248 | B2 | 7/2015 | Ackelid |
| 9,208,986 | B2 | 12/2015 | Zhou et al. |
| 9,224,572 | B2 | 12/2015 | Frontera et al. |
| 9,310,188 | B2 | 4/2016 | Snis |
| 9,341,467 | B2 | 5/2016 | Snis |
| 9,347,770 | B2 | 5/2016 | Snis |
| 9,406,483 | B1 | 8/2016 | Lock |
| 9,415,443 | B2 | 8/2016 | Ljungblad |
| 9,505,172 | B2 | 11/2016 | Ljungblad |
| 9,543,116 | B2 | 1/2017 | Lock |
| 2010/0260410 | A1 | 10/2010 | Taminger et al. |
| 2011/0114839 | A1 | 5/2011 | Stecker et al. |
| 2013/0055568 | A1* | 3/2013 | Dusel .................. B22F 3/1055 29/888.02 |
| 2013/0206740 | A1* | 8/2013 | Pfeifer .................. B23K 9/095 219/124.5 |
| 2015/0034606 | A1 | 2/2015 | Blackmore |
| 2015/0037599 | A1 | 2/2015 | Blackmore |
| 2015/0045928 | A1 | 2/2015 | Perez et al. |
| 2015/0069668 | A1* | 3/2015 | Mironets ............ B23K 15/0086 264/497 |
| 2015/0165683 | A1 | 6/2015 | Cheverton et al. |
| 2015/0321422 | A1 | 11/2015 | Boyer |
| 2015/0375456 | A1 | 12/2015 | Cheverton et al. |
| 2016/0024621 | A1* | 1/2016 | Cheney .................. C22C 38/02 427/256 |
| 2016/0047255 | A1* | 2/2016 | Vargas ...................... F02C 3/10 60/805 |
| 2016/0052086 | A1 | 2/2016 | Mazumder et al. |
| 2016/0179064 | A1 | 6/2016 | Arthur et al. |
| 2016/0184893 | A1 | 6/2016 | Dave et al. |
| 2016/0236279 | A1 | 8/2016 | Ashton et al. |
| 2016/0236414 | A1 | 8/2016 | Reese et al. |
| 2016/0332381 | A1 | 11/2016 | Long et al. |
| 2016/0339519 | A1 | 11/2016 | Sargent |
| 2016/0349215 | A1 | 12/2016 | Todorov |
| 2017/0001379 | A1 | 1/2017 | Long |
| 2017/0023499 | A1 | 1/2017 | Mitchell |
| 2017/0059529 | A1 | 3/2017 | Kamel et al. |
| 2017/0066051 | A1* | 3/2017 | Ackelid ............ G01N 23/20091 |
| 2017/0120337 | A1* | 5/2017 | Kanko .................. B22F 3/1055 |
| 2017/0165751 | A1* | 6/2017 | Buller .................. B23K 26/144 |
| 2017/0210073 | A1 | 7/2017 | Frontera et al. |
| 2017/0291372 | A1* | 10/2017 | Milshtein ............... B33Y 10/00 |

OTHER PUBLICATIONS

Zhao et al., "Real-time monitoring of laser powder bed fusion process using high-speed X-ray imaging and diffraction", Scientific Reports, 2017.
International Search Report Corresponding to Application No. PCT/US2019/020641 dated Mar. 5, 2020.

* cited by examiner

SYSTEM AND METHOD FOR MONITORING AND CONTROLLING BUILD QUALITY DURING ELECTRON BEAM MANUFACTURING

BACKGROUND

The present disclosure relates to electron beam manufacturing systems. More particularly, the present disclosure relates to monitoring and controlling build quality in an electron beam additive manufacturing system.

Recently, additive manufacturing methods for making metal alloy components have emerged as alternatives to casting and machining methods. Additive manufacturing is also referred to as "layered manufacturing," "reverse machining," and/or "3-D printing." On a basic level, additive manufacturing technologies are based on the concept of building up material in a cross-sectional format layer-by-layer to form a 3D component. Common to additive manufacturing technologies is the use of a 3D modeling software (Computer Aided Design or CAD), machine equipment, and layering material. Once a CAD sketch is produced, the machine equipment reads in data from the CAD file and adds successive layers of a desired material to fabricate the 3D component.

Some specific additive manufacturing processes employ a powder bed technique to fuse metal alloy powder in sequential steps to produce a component. For example, some additive manufacturing processes utilize a beam of energy that is scanned across a powder bed to fuse a layer of metal alloy powder in the powder bed in additive steps. Some examples of such powder bed additive manufacturing processes include direct metal laser sintering/fusion (DMLS)/(DMLF), selective laser sintering/fusion (SLS)/(SLF), and electron beam melting (EBM). In these processes, a layer of metal alloy powder in the powder bed is pre-heated and then fused to an underlying partially-formed component (or a seed component) to add a new layer to the component. A new layer of metal alloy powder is deposited into the powder bed and over the previously formed layer of the partially-formed component, and the new layer of metal alloy powder is similarly fused to the component. The depositing-and-fusing procedure is repeated a number of times to produce a plurality of layers on the partially formed component to, ultimately, form the metal alloy component.

In electron beam additive manufacturing, obtaining high quality parts in a challenging build environment is desired. The electron beam additive manufacturing build process typically takes place in a build chamber heated to a temperature range of between 250 C.° to 900 C°, in the presence of a powdered raw material and at a modestly high pressure range of $10^{-3}$-$10^{-6}$ mbar over many hours of build time. Due to the long part build times, each part is expensive and therefore it is important to discover defective parts before completion, and diagnose defects in real-time, and in-situ. Yet, due to these build parameters it is not possible to remove the part periodically to check quality. Accordingly, during the build process, visual light images are commonly compared to the part description to assess quality. This technique only senses the over-all dimensional conformity. Other measures of the part qualities of particular importance remain with regard to porosity, microstructure, alloy composition, average density and feature size. Long build times for complicated metal parts make quality control (as the build proceeds) critical to high yield. If defects are detected during the build, then the operator has an opportunity for in-situ repair. The operator can also abandon the build process partially or completely.

Thus, an additive manufacturing system that provides high-yield part builds so as to avoid the expense of repeated runs and the need for expensive post-build inspection and characterization is desired. The system would provide real-time, and in-situ, control of the build quality in response to in-situ monitoring and analysis, measurement of layer images and capability for in-situ repair of discovered defects or aborting of the build.

BRIEF DESCRIPTION

These and other shortcomings of the prior art are addressed by the present disclosure, which provides a system and method for monitoring and controlling build quality during electron beam manufacturing of a three-dimensional component from a plurality of deposited layers of metallic powder.

In one embodiment, a system for monitoring and controlling build quality during electron beam manufacturing of a build part is provided. The system includes a build chamber, an actuator for moving the build platform in the build chamber, at least one electron beam source for directing at least one electron beam into the build chamber and onto the plurality of deposited layers of metallic powder disposed on the build platform to form a melt pool, a detector and a controller. The detector is configured to detect in real-time backscattered energy ejected from at least one of the melt pool and a region being exposed to the at least one electron beam to detect one or more defects in the build part and generate a detection signal representative of the defect. The controller is configured to receive and analyze the detection signal and generate a corrective signal for control of at least one of the actuator and the at least one electron beam source to direct the at least one electron beam onto the plurality of deposited layers of metallic powder on the build platform to sequentially consolidate patterned portions of the plurality of deposited metallic powder layers to adaptively form the three-dimensional build part. The build chamber includes a housing, a build platform disposed in the build chamber and an actuator for moving the build platform in the build chamber.

In another embodiment, a system for adaptively forming a three-dimensional build from a plurality of deposited layers of metallic powder is provided. The system including a build chamber, at least one electron beam source for directing at least one electron beam into the build chamber and onto the plurality of deposited layers of metallic powder disposed on the build platform to form a melt pool, a detector configured to detect in real-time backscattered energy ejected from the melt pool and indicative of a defect in at least one of a microstructure, a density, a topography and a chemistry of the build part and generate a detection signal representative of the defect, a processor configured to receive and analyze the detection signal and generate a corrective signal, and a controller configured to receive the corrective signal and provide control of at least one of the actuator and the at least one electron beam source to direct the at least one electron beam onto the plurality of deposited layers of metallic powder on the build platform to sequentially consolidate patterned portions of the plurality of deposited metallic powder layers to adaptively form the three-dimensional build part. The build chamber includes a housing, a build platform disposed in the build chamber and an actuator for moving the build platform in the build chamber.

In yet another embodiment, a method for monitoring and controlling build quality during electron beam manufacturing of a build part is provided. The method including: (a) providing at least one electron beam source; (b) controlling the at least one electron beam source to direct the at least one electron beam onto a deposited layer of metallic powder to form a melt pool; (c) detecting backscattered energy radiation from the melt pool in real-time to determine the presence of a defect in one or more of the melt pool and an underlying powder layer; (d) controlling at least one of the electron beam source and an actuator to adjust the at least one electron beam and a build plate in response to a detected defect in the melt pool and consolidate patterned portions of the deposited metallic powder layer; and (e) repeating (a)-(d) to form the three-dimensional build part.

Various refinements of the features noted above exist in relation to the various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of the present disclosure without limitation to the claimed subject matter.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
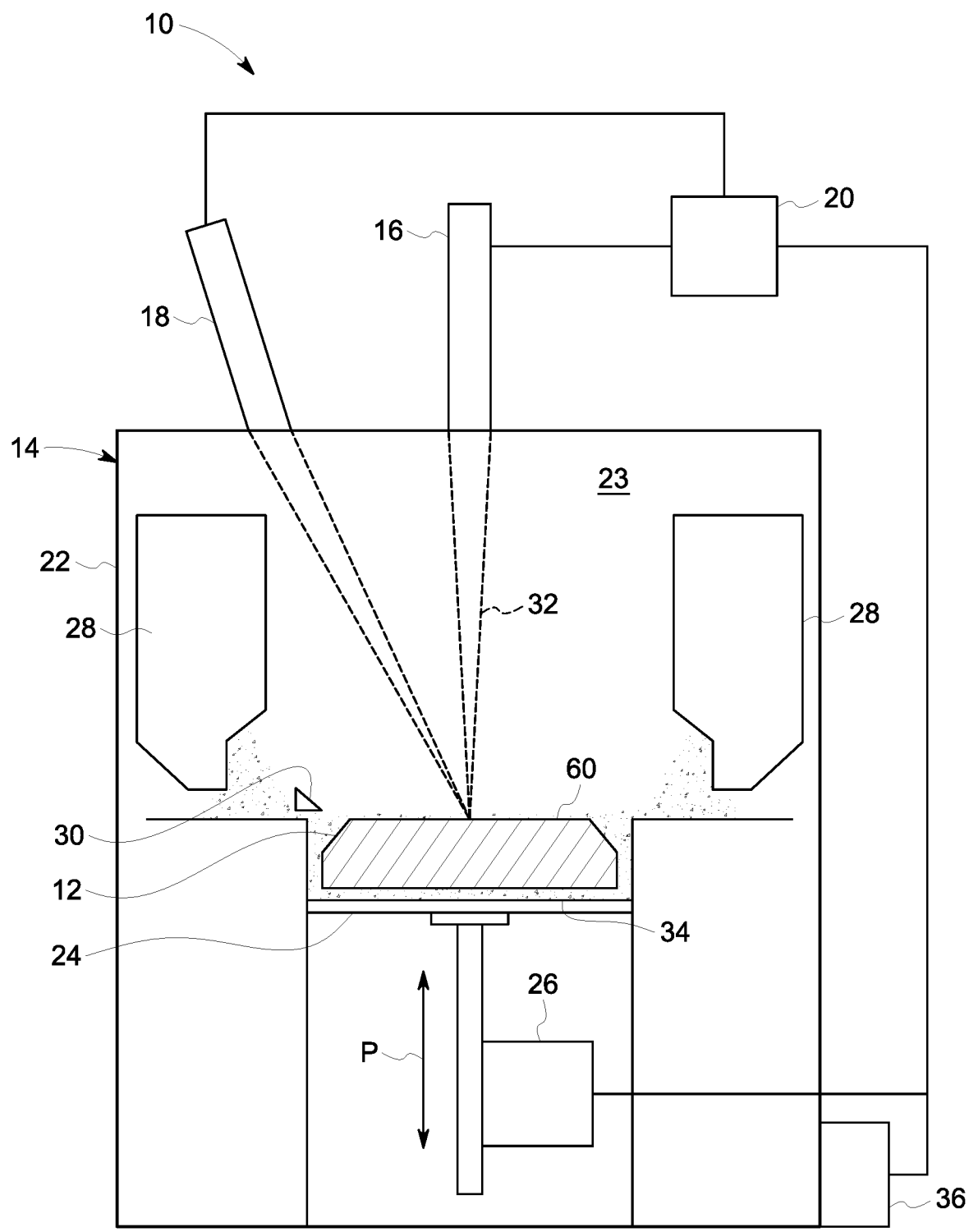
FIG. 1 diagrammatically illustrates in a cross-sectional view an additive manufacturing system employing at least one electron beam source, in accordance with one or more embodiments shown or described herein.

Embodiments of the present disclosure and certain features, advantages, and details thereof, are explained more fully below with reference to the non-limiting examples illustrated in the accompanying drawings. Descriptions of well-known materials, processing techniques, etc., are omitted so as not to unnecessarily obscure the disclosure in detail. It should be understood, however, that the detailed description and the specific examples, while indicating embodiments of the present disclosure, are given by way of illustration only, and not by way of limitation. Various substitutions, modifications, additions, and/or arrangements, within the spirit and/or scope of the underlying inventive concepts will be apparent to those skilled in the art from this disclosure.

As described in detail below, embodiments of the present disclosure provide a system and method for monitoring and controlling build quality during electron beam manufacturing. Using such disclosed configurations, the method and system may provide improved to improve yield, allow for repair of defects, control of build quality and optimizing of the build process.

The terms "first," "second," and the like, herein do not denote any order, quantity, or importance, but rather are used to distinguish one element from another and intended for the purpose of orienting the reader as to specific components parts. Approximating language, as used herein throughout the specification and claims, may be applied to modify any quantitative representation that could permissibly vary without resulting in a change in the basic function to which it is related. The modifier "about" used in connection with a quantity is inclusive of the stated value, and has the meaning dictated by context, (e.g., includes the degree of error associated with measurement of the particular quantity). Accordingly, a value modified by a term or terms, such as "about", is not limited to the precise value specified. In some instances, the approximating language may correspond to the precision of an instrument for measuring the value.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise. In addition, in this specification, the suffix "(s)" is usually intended to include both the singular and the plural of the term that it modifies, thereby including one or more of that term (e.g., "the defect" may include one or more defects, unless otherwise specified). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. Similarly, reference to "a particular configuration" means that a particular element (e.g., feature, structure, and/or characteristic) described in connection with the configuration is included in at least one configuration described herein, and may or may not be present in other configurations. In addition, it is to be understood that the described inventive features may be combined in any suitable manner in the various embodiments and configurations.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances, an event or capacity can be expected, while in other circumstances the event or capacity cannot occur—this distinction is captured by the terms "may" and "may be".

Referring now to the figures, FIG. 1 diagrammatically illustrates a system 10 in accordance with an embodiment of the present disclosure for monitoring and controlling build quality during electron beam manufacture (ESM) of a three-dimensional build part 12 from a plurality of deposited layers of metallic powder. The system 10 generally includes a build chamber 14, at least one electron beam source 16, at least one detector 18 and a controller 20. The build chamber 12 may include a housing 22 defining a vacuum chamber 23, a build platform 24 disposed in the build chamber 14, an actuator 26 for moving the build platform 24 in the build chamber 14, one or more powder hoppers 28, and a powder distributor 30. In an embodiment, the at least one electron beam source 16 may include at least one beam gun or source for directing at least one electron beam 32 into the build chamber 14 and onto a plurality of deposited layers of metallic powder 60 disposed on the build platform.

To provide for monitoring of the build part 12 during the build process, the system provides for a means to continuously monitor the build process and identify one or more defects forming within the build part 12 in real-time, and in-situ. To provide such monitoring, the at least one detector 18 is configured to include specific radiation and particle detectors and is installed in the main build chamber 14 of the electron beam manufacturing system 10. Referring still to FIG. 1, in the illustrated embodiment the detector or alternative type probe is fit to existing equipment. During deposition a number of signals are generated that can be used to enable quality control, via part characterization. More specifically, it has been found that during the build process, the number of electrons, photons and the energy spectra can be analyzed to deduce the quality of the build part 12. One example of monitoring signals, as previously indicated, is the monitoring of back-scatter radiation or particles. Accordingly, in an embodiment the at least one detector 18 is operable to detect ejected electrons, ions and radiation in the melt pool (described presently) during the build process for real time monitoring of the build part's microstructure, topography and chemistry for the location of defects therein the build part 12. Backscattered energy during the build process, and more particularly, backscattered electrons (BSE), are generally considered as parasitic and present a significant fraction (tens of percent) of that scattered from solid targets. This minimal amount of backscatter, in conjunction with energy filtering, provides ample signal for detection by the at last one detector 18 to analyze as quality indicators of the build part 12 during the build process. In an embodiment, energy selecting or momentum analyzing apparatus use electrostatic and/or magnetic fields to discriminate on particle energy or momentum. Photon energy analyzing detectors discriminate signal by the amplitude of a signal proportional to its energy. Accordingly, as illustrated, in an embodiment the at least one detector 18 is configured as a separate component and conducts the detection separate from the part build steps.

Figure 2:
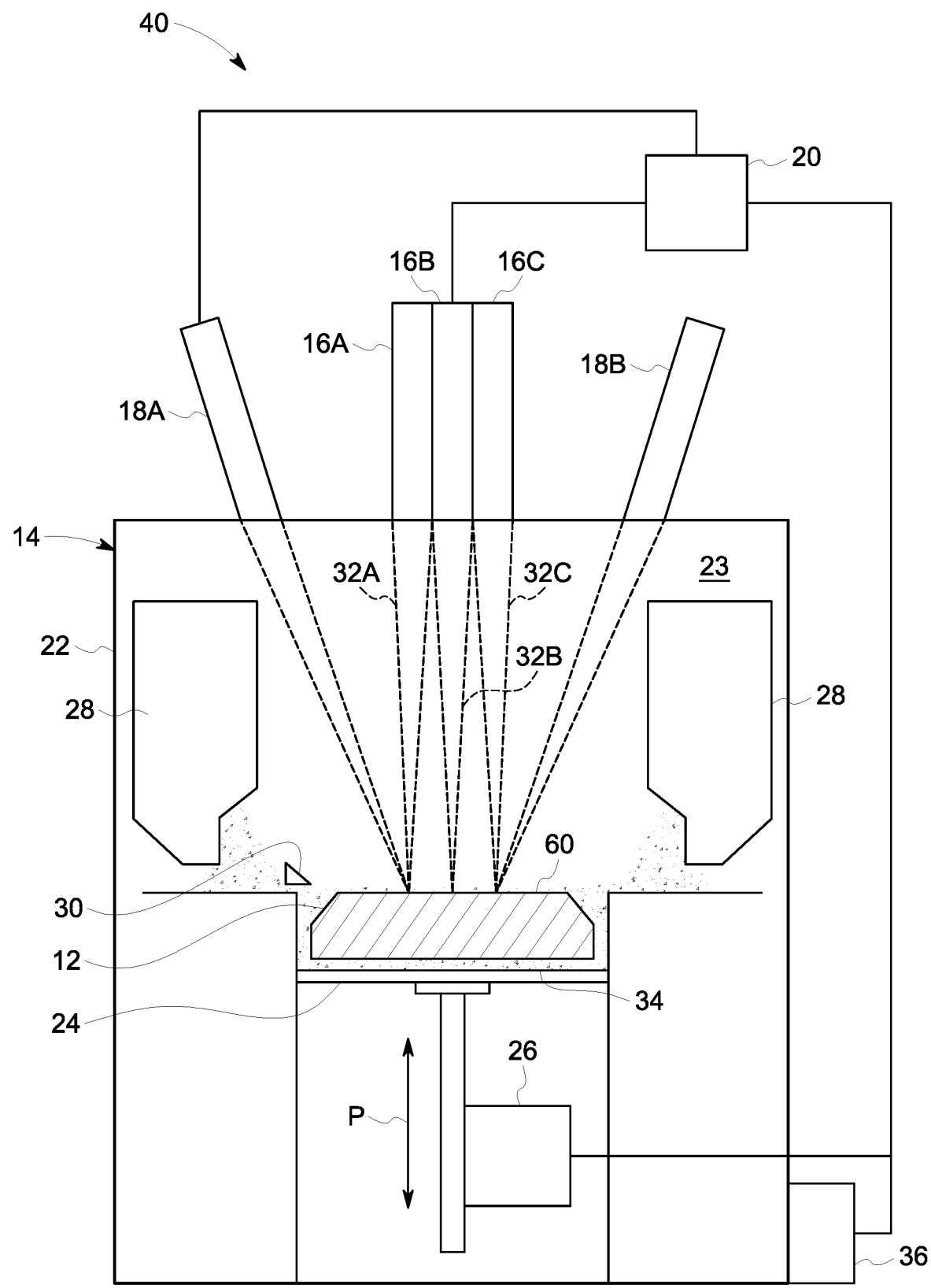
FIG. 2 diagrammatically illustrates in a sectional view an additive manufacturing system employing a plurality of electron beam sources, in accordance with one or more embodiments shown or described herein.

In another embodiment as shown in FIG. 2, a second embodiment of a system 40 is illustrated. Unless otherwise indicated, the second embodiment includes the same components identified during the description of the first embodiment of the system, as shown in FIG. 1. In contrast to the first embodiment, the at least one electron beam source 16 may include a plurality of separate electron guns or other sources 16A, 16B, 16C for directing a plurality of electron beams 32A, 32B, 32C into the build chamber 14 and onto a plurality of deposited layers of metallic powder. In an embodiment, at least one of the plurality of beam guns or sources 16 is a dedicated build-analysis beam. In addition, the system 40 may include a plurality of detectors 18A, 18B for monitoring the build quality of the build part 12. The plurality of detectors 18A, 18B are coupled to the controller for real-time, and in-situ, re-work or correction of defects by directing one or more of the plurality of electron beams 32A, 32B, 32C back to an area of the build part 12 with the defect. In an embodiment, the plurality of detectors 18A, 18B are energy sensitive photon-counting detectors, configured to provide energy and or wavelength dispersive X-ray analysis. The plurality of detectors 18A, 18B may be configured to include the detection of backscattered energy, including backscattered electrons, secondary electrons, Auger electrons, backscattered photons and radiation for the monitoring of defects in the melt pool of the build part 12 and generate a detection signal. The plurality of detectors 18A, 18B may also be configured to include the detection of X-rays (either total X-ray yield or energy dependent X-ray yield which more clearly defines the actual chemistry of the material).

Referring still to FIGS. 1 and 2, the controller 20 is operable for simultaneously controlling the actuator 26 and the at least one electron beam source 16 to direct the at least one electron beam 32 onto the plurality of deposited layers of metallic powder 60 on the build platform 24 to sequentially consolidate patterned portions of the plurality of deposited metallic powder layers 60 to adaptively form the three-dimensional build part 12. The controller 20 is further operable to output control parameters from the at least one detector 18 in response to received signals depicting defects in the build part 12. The controller 20 may be configured to optimize a rate of consolidating the patterned portions of the plurality of deposited metallic powder layers 60 and minimize thermal gradients in consolidating the patterned portions of the plurality of deposited metallic powder layers 60 to form the three-dimensional build part 12 having a single crystal structure. By recording the build parameters, and performing analytics on the data, one may be able to predict defects prior to the analysis.

As will be appreciated from the present description below, the technique of the present disclosure improves build quality by monitoring and detecting build defects during the build process, in real-time, and in-situ.

With reference still to FIGS. 1 and 2, the powder hoppers 28 may hold powder material which is provided on a start plate 34. The powder material may be pure metals or metal alloys such as titanium, titanium alloys, aluminum, aluminum alloys, stainless steel, Co—Cr—W alloy, etc. A first powder layer may be provided by distributing powder evenly over the start plate 34 or a solidified patterned layer. For example, material deposited from hoppers 28 may be distributed by powder distributor 30 such as a rake system. The rake may be moved to distribute the powder over the start plate 34 or a solidified patterned layer. The distance between a lower part of the distributor 30 and the upper part of the start plate 34 or solidified patterned layer may determine a thickness of distributed powder layer. The powder layer thickness may be easily adjusted by adjusting the height of the build platform 24 via the actuator 26.

At least one of the at least one electron beam guns or sources 16 may be provided in or in fluid communication with the vacuum system 36 in the build chamber 14. The build chamber 14 may be operable for maintaining a vacuum environment by means of the vacuum system 36, which vacuum system may comprise a turbo-molecular pump, a scroll pump, and/or an ion pump, as well as one or more valves which are well known to a skilled person in the art. The vacuum system 36 may be controlled by the controller 20. One can also control process gas injection, pressure and flow.

The three-dimensional build part 12 may be formed through successive fusion of parts of a powder bed, which corresponds to successive cross-sections of the three-dimensional build part 12, and include a step of providing a model of the three dimensional build part 12. The model may be generated via a CAD (Computer Aided Design) tool.

Figure 3:
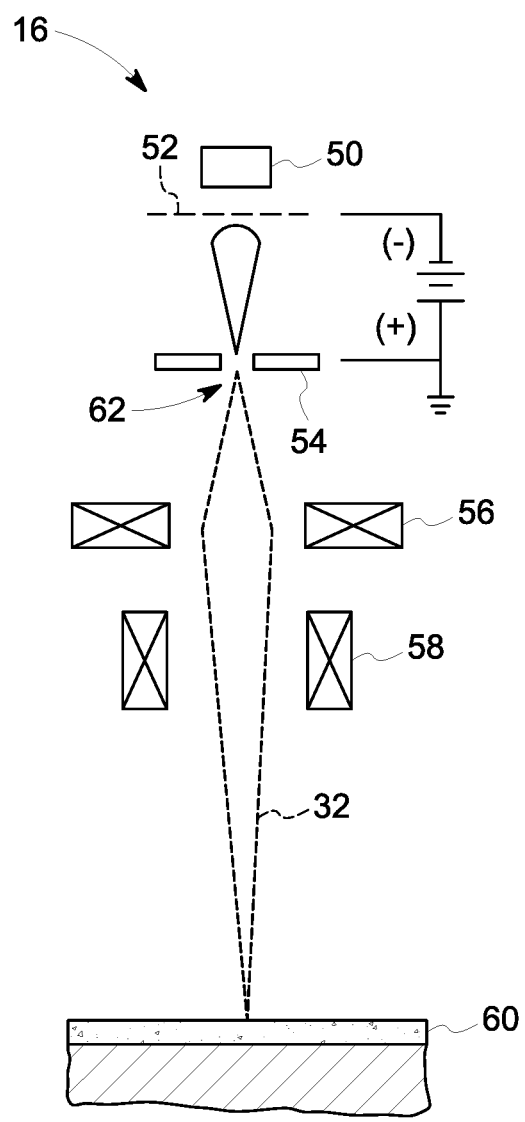
FIG. 3 diagrammatically illustrates in a sectional view an embodiment of the at least one electron beam source of FIG. 1, in accordance with one or more embodiments shown or described herein.

FIG. 3 illustrates one embodiment of electron beam gun or source 16 for producing the at least one electron beam 32. For example, the electron beam gun or source 16 may generally include a cathode 50, a grid 52, and an anode 54, which is used to generate and accelerate a primary electron beam. An electromagnetic focusing coil 56 and/or deflection/scan coil 58 may be used for controlling the way in which the electron beam 32 impinges on the powder layer 60 being processed. In operation, the cathode 50 may be a source of thermally-emitted electrons that are both accelerated and shaped into a collimated beam by the electrostatic field geometry established by the grid 52 and the anode 54. The electron beam 32 then emerges through an exit hole 62 in the anode 54 with, for example, an energy equal to the value of the negative high voltage being applied to the cathode 50. After exiting the anode 54, the electron beam 32 passes through the electromagnetic focusing coil 56 and the deflection coil 58. The electromagnetic focusing coil 56 is used for producing either a focused or defocused beam spot on the powder layer 60, while the deflection coil 58 is used to either position the beam spot on a stationary location or move the spot over a region of the powder layer 60. It will be appreciated that other types of electron beam guns or sources and/or additional components may be suitably employed.

With reference again to FIGS. 1 and 2, the at least one electron beam gun or source 16 generates the at least one electron beam 32 which is used for melting or fusing together the powder material or powder layer 60. During a work cycle or additive build, the build platform 24 is lowered successively in relation to the at least one electron beam source 16 after each added layer of powder material. For example, the build platform 24 may be movable in a vertical direction, i.e., in the direction of double-headed arrow P. The build platform 24 may be disposed in an initial position, in which a first powder material layer of desired thickness has been laid down on the start plate 34. The build platform 24 is thereafter lowered in connection with laying down a new powder material layer 60 for the formation of a new cross-section of a three-dimensional component, and more particularly the build part 14. The actuator 26 or means for lowering the build platform 24 may include a servo motor equipped with a gear, adjusting screws, etc.

The controller 20 may be used for controlling, among other things, the at least one electron beam source 16, the actuator 26, the powder distributor 30, and the vacuum pressure in the build chamber 14. For example, the controller 20 may be operable for controlling and managing the position or location of the at least one electron beam 32 impinging on a patterned layer during the time for heating the powder layer. The controller 20 may include instructions for controlling each of the at least one electron beam 32 for each layer of the three-dimensional build part 14 to be formed.

Figure 4:
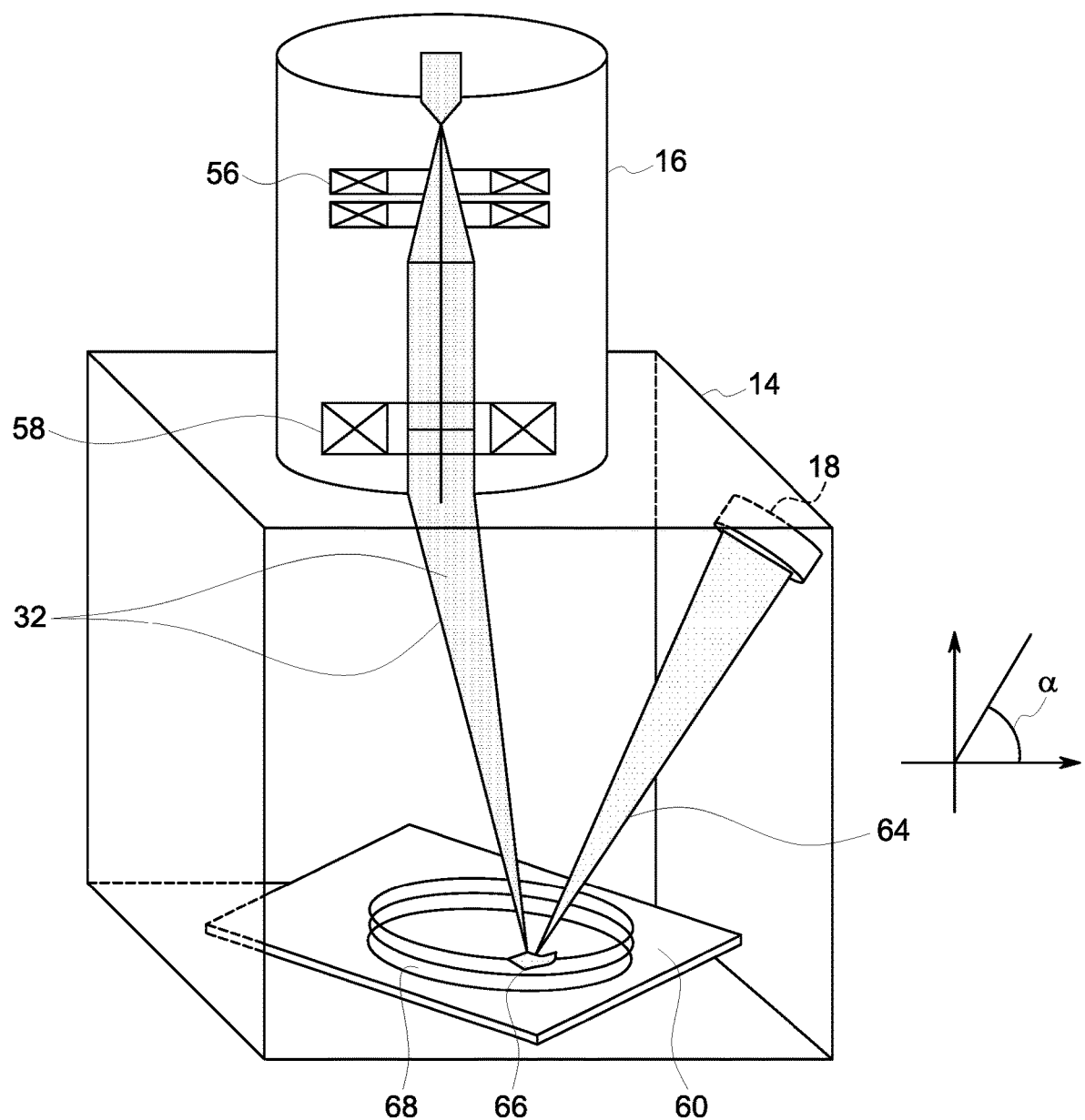
FIG. 4 diagrammatically illustrates in an orthogonal view an additive manufacturing system illustrating at least one electron beam source relative to a detector, in accordance with one or more embodiments shown or described herein.

As best illustrated in FIG. 4 in a schematic orthogonal view, the at least one detector 18 is positioned relative to the at least one electron beam 32 and the build part 12 to provide real-time, and in-situ, monitoring of the build part 12 during the work cycle. More specifically, during operation the at least one electron beam source 16 provides for scanning the powder layer 60 to fuse in a selective melting process forming a melt pool 66. In an embodiment, during the melting process, backscattered energy, and more particularly backscattered electrons 64 from the melt pool 66 and or underlying layers, and more particularly from the interaction between the at least one electron beam 32 and the powder layer 60 are detected in real-time, and in-situ, and with or without energy filtering by the detector 18, for subsequent analyzing, such as by analyzing software Any defects in the melt pool 66, and a subsurface layer 68, can then be identified and repaired prior to selective melting of a subsequent powder layer. In the disclosed system and method, the at least one primary electron beam 32, also referred to as the melt beam, is utilized as an inspection probe. The use of the at least one primary electron beam 32 improves upon pre- or post-melting layer-by-layer inspection strategies that utilize secondary scanning, which lead to significant process time penalties due to the required additional scan times. The detector 20 provides detection of voids, low-density zones, zones with different chemistry, contaminated zones, and the like in the build part 14 in real-time, and in-situ, by enabling analysis of the melt pool 66 and the subsurface layer 68.

The detector 18 is placed above the build part 12 in the build chamber 14 based on the scattering geometry relative to the incident at least one electron beam 32. In an embodiment, an optimum detector angle $\alpha$ is in a range of 40°-80°. Positioning the detector 18 at this angle provides optimal detection of defects. The detector 18 collects backscattered energy, and more particularly backscattered electrons 64, and/or radiation, as a function of the microstructure, topography and chemistry of the build part 14. The backscattered electrons 64 will vary in their amount and direction due to the microstructure, topography and chemistry of the build part 12.

The real-time, and in-situ, monitoring and analyzing of the build quality as described herein can also be based on detection of X-rays instantaneously generated during energy deposition by the at least one electron beam 16. This type of detection fundamentally differs from registration of thermal signature by optical methods that only sense surface defects (less than 100 nm). The detector 20 as described herein provides for probing at significantly greater depths (few to tens of microns) to sense layer and defect morphology. In addition, X-ray sensors, such as detector 20 are not sensitive to background signals (scattered light, thermal emission etc.) always present in the build chamber 14 and that typically degrades measurement fidelity due to reduced signal-to-noise.

In one or more embodiments, the system 10 for monitoring and controlling build quality during electron beam manufacture (EBM) may include the at least one electron beam source 16 which is operable to process a two-dimensional powdered layer having a width of about 25 millimeters (about 1 inch) and a length of about 25 millimeters (about 1 inch). The at least one electron beam gun or source 16 may provide a two-dimensional electron beam thermal spot of having a width of about 0.1 millimeter and a length of about 0.1 millimeter. Each two-dimensional region (e.g., about 25 millimeters by about 25 millimeters region) may include about 62,500 sub-regions (e.g., different about 0.1 millimeter by about 0.1 millimeter sub-regions).

With reference again to FIGS. 1-4, a first powder layer 60 may be disposed on the start plate 32. The at least one electron beam 32 may be directed over the start plate 34 causing the first powder layer 60 to fuse in selected locations to form a first layer of the three-dimensional build part 12. For example, the control unit 20 is operable for directing the location or position the at least one electron beam 32 engaging the first powder layer 60. During this formation of the first layer, the at least one detector 18 detects backscattered electrons 64 (FIG. 4) in the melt pool or solidified layer 66 (FIG. 4) to monitor for the presence of defects in the melt pool 66 or solidified layer.

As previously indicated, the detector 18 is configured to receive the backscattered electrons 64, and is in communication with analyzing software of the controller 20 to provide adjustments to the actuator 20 and/or the at least one electron beam source 16 upon the detection of defects in the melt pool 66 or underlying powder layer 42, such as to by adjusting the rate of consolidation of the patterned portions, adjusting the power of the electron beam 32, adjusting the size of the melt pool 66, or the like.

After any defects present have been addressed and the first layer is formed, a second powder layer 60 is provided on top of the first solidified layer 68. After distribution of the second powder layer 60, the at least one electron beam 32 is directed onto the second powder layer 60 melting the second powder layer 60 to form a melt pool 66. The at least one detector 18 continually monitors in real-time, and in-situ, the backscattered electrons 64 of the melt pool 66 of the second powder layer 60 for the detection of defects, while the at least one electron beam 32 causes the second powder layer 60 to fuse in selected locations to form a second cross-section of the three-dimensional build part 14. Fused portions in the second layer may be bonded to fused portions of the first layer. The fused portions in the first and second layer may be melted together by melting not only the powder in the uppermost layers but also remelting at least a fraction of a thickness of a layer directly below the uppermost layer.

In one or more embodiments of the present disclosure, the at least one electron beam source 16 may generate the at least one focusable electron beam 32 with an accelerating voltage of about 60 kV to 120 kV and with a beam power in the range of about 0 kW to about 10 kW, about 2 kW to about 8 kW, about 5 kW to about 7 kW, or about 6.5 kW.

In one or more embodiments, the three-dimensional build part 12 may be a turbine component such as a turbine airfoil or blade. In one or more embodiments, the three-dimensional build part 12 may be a turbine component repair. For repair of a turbine blade, an array of electron beam sources may include a linear array of 1 by 10 electron beam sources 16.

Figure 5:
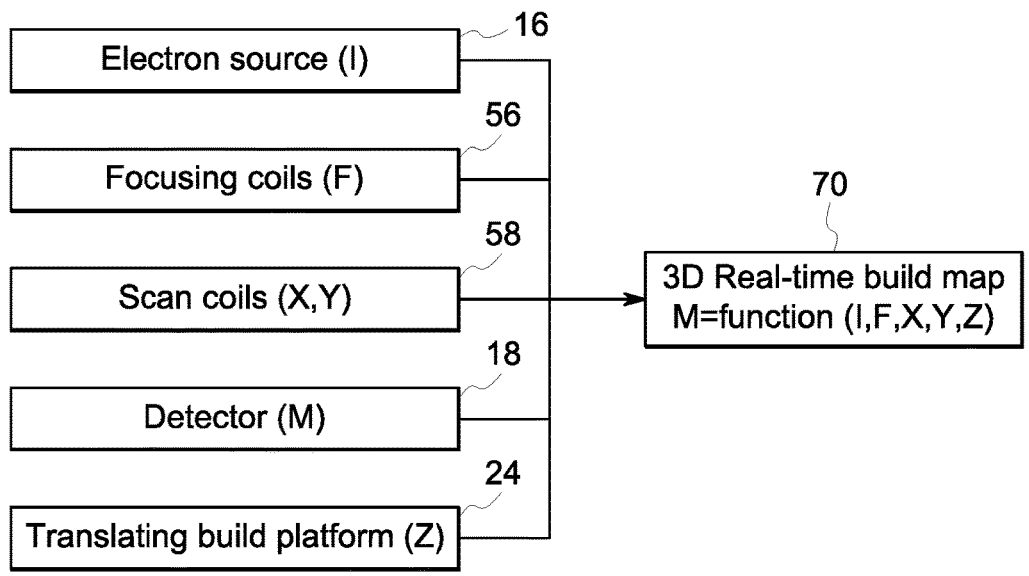
FIG. 5 illustrates a flowchart of a method for adaptively forming three-dimensional build map, in accordance with one or more embodiments shown or described herein.

FIG. 5 illustrates a flowchart of a method for adaptively forming a three-dimensional build map 70 according to the present disclosure. The build map 70 is a function of a plurality of process parameters and detected signal values mapped in a 3D space. The plurality of process parameters includes an electron beam current (I) from the electron source 16 and one or more focusing coils settings (F) of focusing coils 56. Each voxel of the build map 70 is identified by the layer identification corresponding to a translating beam platform position (Z) of the build platform 24 and scan coil values (X, Y) of the scan coils 58 within each layer.

Figure 6:
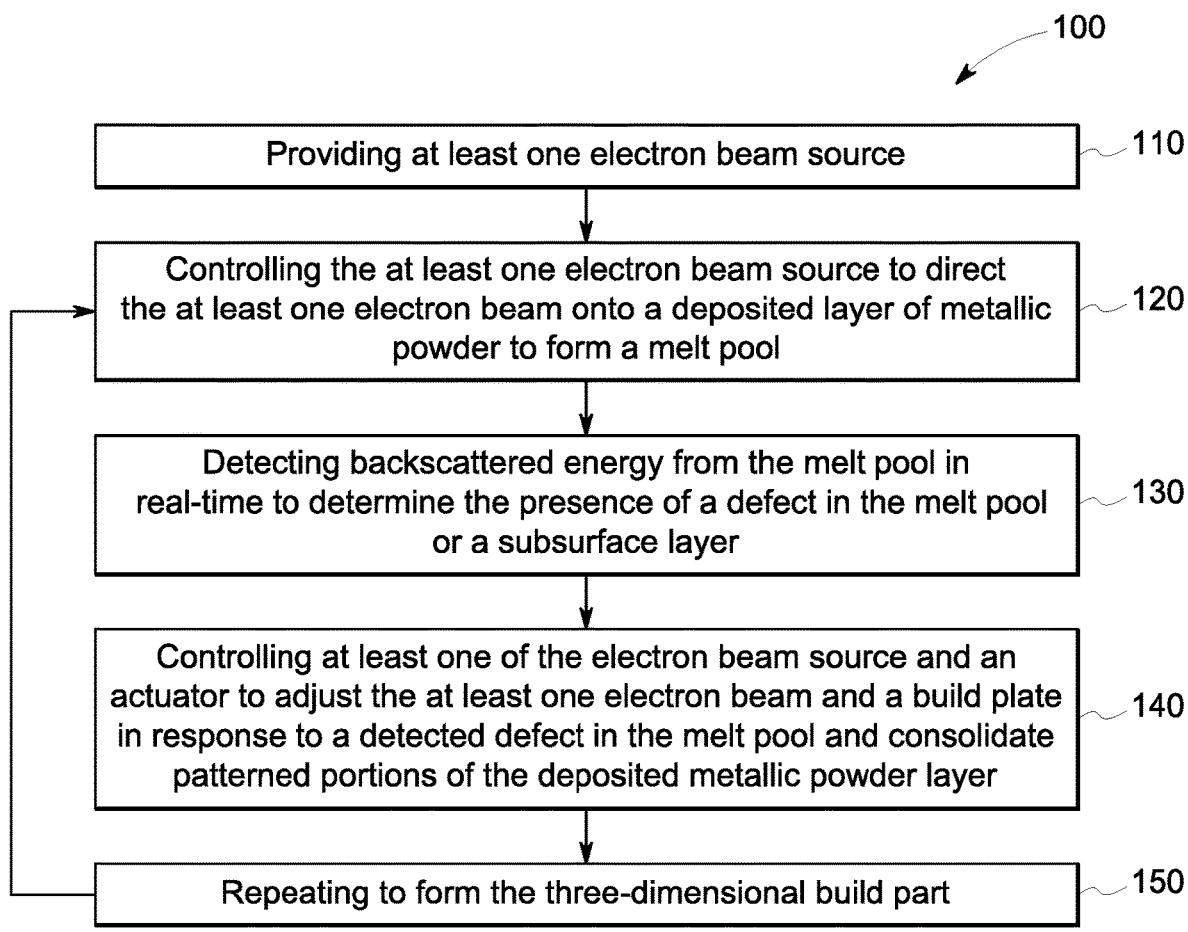
FIG. 6 illustrates a flowchart of a method for monitoring and controlling build quality during electron beam manufacturing of a three-dimensional build part, in accordance with one or more embodiments shown or described herein.

FIG. 6 illustrates a flowchart of a method 100 for monitoring and controlling the build quality during electron beam manufacturing in accordance with the present disclosure. For example, method 100 may include providing at least one electron beam source, in a step 110. Next, the at least one electron beam source is controlled by the controller so as to direct the at least one electron beam onto a deposited layer of metallic powder to form a melt pool, in a step 120. Simultaneously with the forming of the melt pool, a detector monitors backscattered energy, and more particularly, backscattered electrons and/or radiation, as a function of the microstructure, topography and chemistry of the build part to determine the presence of a defect in the melt pool, or an underlying layer, in a step 130. The detector is configured to monitor the backscattered particles, and/or radiation in real-time, in situ, for submission to the controller to analyze the detected backscattered energy to determine if a defect exists and provide corrective steps. Next, in a step 140, the controller provides control parameters to the at least one electron beam source and/or the actuator to so as to adjust the at least one electron beam and/or the build plate in response to a detected defect in the melt pool and/or consolidate patterned portions of the deposited metallic powder layer or underlying layers. The process is repeated, in a step 150, to sequentially consolidate patterned portions of the plurality of deposited metallic powder layers to adaptively form the three-dimensional build part.

Figure 7:
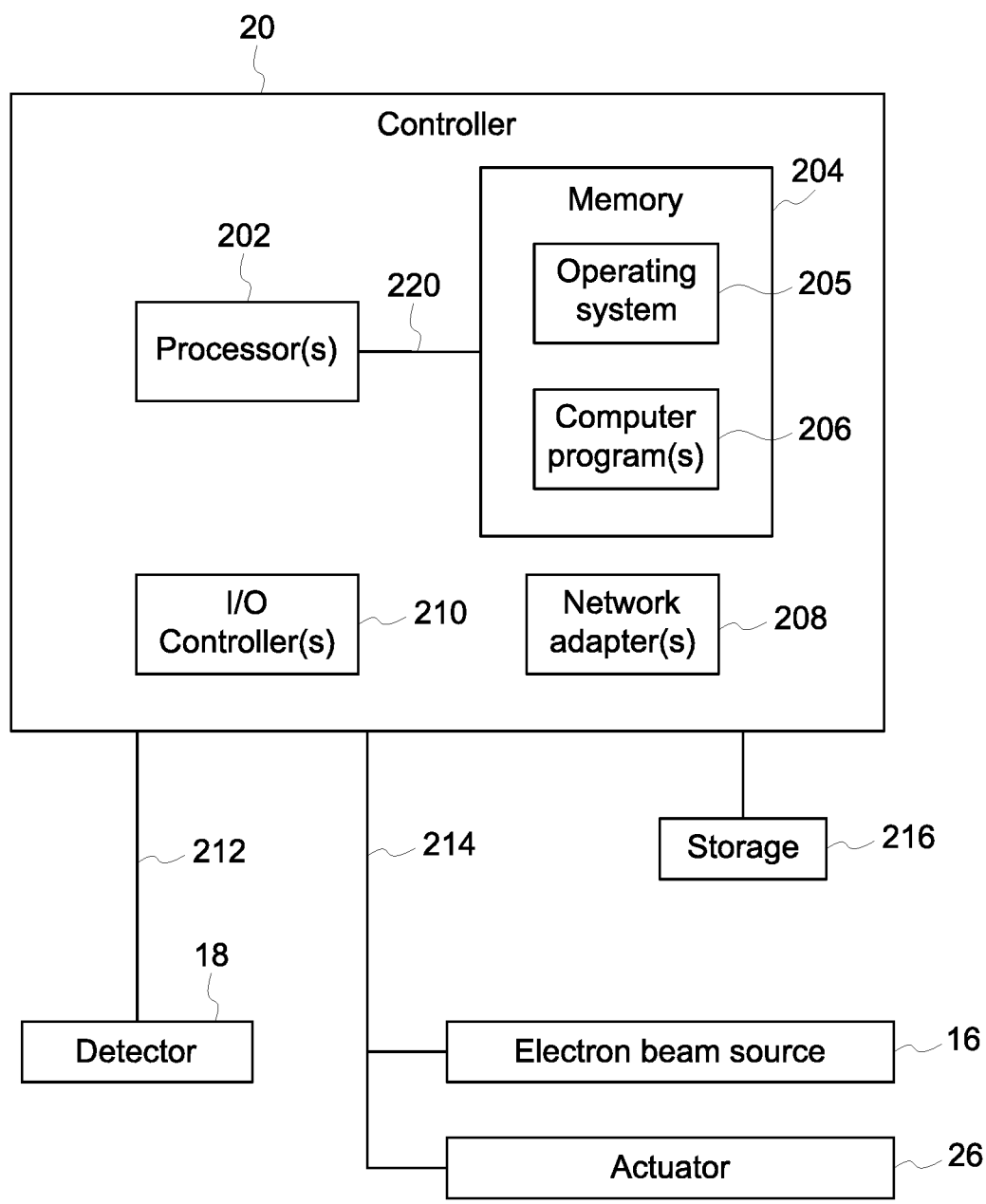
FIG. 7 is a block diagram of a portion of the additive manufacturing system of FIG. 1, in accordance with one or more embodiments shown or described herein.

FIG. 7 is a block diagram of the controller 20, coupled to the at least one electron beam source 16, the at least one detector 18 and the actuator 26 in accordance with one embodiment of the present disclosure. In an embodiment, the controller 20 is suitable for storing and/or executing program code, such as program code for performing the processes described above, and includes at least one processor 202 coupled directly or indirectly to memory 204 through, a bus 220. In operation, the processor(s) 202 obtains from memory 204 one or more instructions for execution by the processors in response to data from the detector 18 as to the presence of a defect. The memory 204 may include local memory employed during actual execution of the program code, bulk storage, and cache memories which provide temporary storage of at least some program code in order to reduce the number of times code must be retrieved from bulk storage during program code execution. A non-limiting list of examples of memory 204 includes a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The memory 204 includes an operating system 205 and one or more computer programs 206, performing the processes described above in connection with the additive manufacturing system and real-time monitoring of the build part for defects.

In an embodiment, the at least one detector 18 is coupled to the controller 20 through input 212. The at least one electron beam source 16 and the actuator 26 are coupled to the controller 214 through output 214. The coupling to the controller 20 via the input/output (I/O) devices 212 and 214 may be either directly or through I/O controllers 210.

Network adapters 208 may also be coupled to the system to enable the data processing system to become coupled to other data processing systems through intervening private or public networks. Modems, cable modem and Ethernet cards are just a few of the currently available types of network adapters 208. In one example, network adapters 208 and/or input devices 212 facilitate obtaining data from the at least one detector 18 of a build process in which a three-dimensional build part 14 is formed.

The controller 20 may be coupled to storage 216 (e.g., a non-volatile storage area, such as magnetic disk drives, optical disk drives, a tape drive, etc.), having one or more databases. The storage 216 may include an internal storage device or an attached or network accessible storage. The computer programs in storage 216 may be loaded into memory 204 and executed by a processor 202 in a manner known in the art.

The controller 20 may include fewer components than illustrated, additional components not illustrated herein, or some combination of the components illustrated and additional components. In addition, in an embodiment the at least one detector 18 may be configured to detect the particle backscatter, and/or radiation, and provide analyzing of the detected signal for submission of control parameters to the controller 20. The controller 20 may include any computing device known in the art, such as a mainframe, server, personal computer, workstation, laptop, handheld computer, telephony device, network appliance, virtualization device, storage controller, etc. In addition, processes described above may be performed by multiple controllers 20, working as part of a clustered computing environment.

In some embodiments, aspects of the present invention may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may comprise a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to comprise a tangible medium that can contain or store program code for use by or in connection with an instruction execution system, apparatus, or device, such as a processor. The program code stored in/on the computer readable medium therefore produces an article of manufacture (such as a "computer program product") including program code. By recording all build parameters, including that from the in-situ monitor, will enable the use of advanced data analytical algorithms such as chemometrics or multivariate statistical analysis, which may in an unbiased format, identify defects and/or when the instrument is drifting out of specification.

It is to be understood that the above description is intended to be illustrative, and not restrictive. Numerous changes and modifications may be made herein by one of ordinary skill in the art without departing from the general spirit and scope of the disclosure as defined by the following claims and the equivalents thereof. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Also, the term "operably" in conjunction with terms such as coupled, connected, joined, sealed or the like is used herein to refer to both connections resulting from separate, distinct components being directly or indirectly coupled and components being integrally formed (i.e., one-piece, integral or monolithic). Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure. It is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

This written description uses examples, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for monitoring and controlling build quality during electron beam manufacturing of a three-dimensional build part, the system comprising:
   a build chamber comprising:
      a housing;
      a build platform disposed in the build chamber; and an actuator for moving the build platform in the build chamber;
at least one electron beam source for directing at least one electron beam into the build chamber and onto a layer of metallic powder disposed on the build platform to form a melt pool;
an energy sensitive photon-counting detector that includes one or more of energy and wavelength dispersive components, the energy sensitive photon-counting detector configured to detect in real-time backscattered energy ejected from the melt pool being exposed to the at least one electron beam to detect one or more defects in the melt pool, the backscattered energy being one or more of backscattered electrons, secondary electrons, Auger electrons, backscattered photons, and radiation ejected from the melt pool and generate a detection signal representative of the defect, wherein the one or more defects in the melt pool is indicative of a defect in at least one of a density and a chemistry of the three-dimensional build part; and
a controller configured to receive and analyze the detection signal and generate a corrective signal for control of at least one of the actuator and the at least one electron beam source to direct the at least one electron beam onto the layer of metallic powder on the build platform to sequentially consolidate patterned portions of the layer of metallic powder to adaptively form the three-dimensional build part;
wherein each the actuator and the at least one electron beam source is configured for adjustment by the controller based on the corrective signal, and the adjustment by the controller affects at least one of a consolidation rate and a melt pool size.

2. The system of claim 1, wherein the energy sensitive photon-counting detector is configured to provide real-time in-situ detection of one or more of the density and the chemistry of the three-dimensional build part.

3. The system of claim 1, wherein the backscattered energy is one or more of backscattered electrons, secondary electrons, Auger electrons, backscattered photons and radiation ejected from at least one of the layer of metallic powder and the melt pool.

4. The system of claim 1, comprising a plurality of electron beam sources for directing a plurality of electron beams into the build chamber and onto the layer of metallic powder disposed on the build platform to form the melt pool.

5. The system of claim 4, wherein at least one of the plurality of electron beams is a dedicated build-analysis beam.

6. The system of claim 1, wherein the energy sensitive photon-counting detector is a retrofit detector, retrofitted to an existing port in the build chamber.

7. The system of claim 1, wherein the three-dimensional build part comprises one of a turbine component and a turbine component repair.

8. A system for adaptively forming a three-dimensional build part from a plurality of deposited layers of metallic powder, said system comprising:
a build chamber comprising:
a housing;
a build platform disposed in the build chamber; and
an actuator for moving the build platform in the build chamber;
at least one electron beam source for directing at least one electron beam into the build chamber and onto the plurality of deposited layers of metallic powder disposed on the build platform to form a melt pool;
an energy sensitive photon-counting detector that includes one or more of energy and wavelength dispersive components, the energy sensitive photon-counting detector configured to detect in real-time backscattered energy ejected from the melt pool being exposed to the at least one electron beam to detect a defect in the melt pool, the backscattered energy being one or more of backscattered electrons, secondary electrons, Auger electrons, backscattered photons, and radiation ejected from the melt pool and the defect indicative of a defect in at least one of a density and a chemistry of the three-dimensional build part, the energy sensitive photon-counting detector configured to generate a detection signal representative of the defect;
a processor configured to receive and analyze the detection signal and generate a corrective signal; and
a controller configured to receive the corrective signal and provide control of at least one of the actuator and the at least one electron beam source to direct the at least one electron beam onto the plurality of deposited layers of metallic powder on the build platform to sequentially consolidate patterned portions of the plurality of deposited layers of metallic powder to adaptively form the three-dimensional build part;
wherein each the actuator and the at least one electron beam source is configured for adjustment by the controller based on the corrective signal, and the adjustment by the controller affects at least one of a consolidation rate and a melt pool size.

9. The system of claim 8, wherein the backscattered energy is one or more of backscattered electrons, secondary electrons, Auger electrons, backscattered photons and radiation ejected from at least one of the melt pool and underlying powder layer.

10. The system of claim 8, wherein the energy sensitive photon-counting detector includes one or more energy and wavelength dispersive X-ray analyzers.

11. The system of claim 8, further comprising a dedicated build-analysis beam.

12. The system of claim 8, wherein the energy sensitive photon-counting detector is a retrofit detector, retrofitted to an existing port in the build chamber.

13. The system of claim 8, wherein said at least one electron beam source is fixed relative to the plurality of deposited layers of metallic powder, and said controller is operable to independently direct the at least one electron beam source onto the plurality of deposited layers of metallic powder.

14. The system of claim 8, wherein said controller is operable to optimize a rate of consolidating the patterned portions of the plurality of deposited layers of metallic powder to form the three-dimensional build part having a single crystal structure in response to the corrective signal.

15. A method for monitoring and controlling build quality during electron beam manufacturing of a three-dimensional build part, the method comprising:
(a) providing at least one electron beam source;
(b) controlling the at least one electron beam source to direct an at least one electron beam onto a deposited layer of metallic powder to form a melt pool;
(c) detecting backscattered energy from the melt pool with an energy sensitive photon-counting detector in real-time to determine a presence of a defect in the melt pool, wherein the defect is indicative of a defect in at least one of a density and a chemistry of the three-dimensional build part, wherein the energy sensitive photon-counting detector includes one or more of energy and wavelength dispersive components;

(d) controlling at least one of the electron beam source and an actuator to adjust the at least one electron beam and a build plate in response to the determined presence of the defect in the melt pool and consolidate patterned portions of the deposited layer of metallic powder, wherein each the actuator and the at least one electron beam source is configured for adjustment based on the defect in the melt pool, and the adjustment affects at least one of a consolidation rate and a melt pool size; and (e) repeating (a)-(d) to form the three-dimensional build part.

16. The method of claim 15, wherein the controlling comprises optimizing a rate of consolidating the patterned portions of the deposited layer of metallic powder in response to the determined presence of the defect in the melt pool to form the three-dimensional build part having a single crystal structure.

17. The method of claim 15, wherein the three-dimensional build part is a turbine component or a turbine component repair.

18. The system of claim 1, wherein the at least one electron beam has an accelerated voltage of about 60 kilovolts to about 120 kilovolts and has a beam power in a range of about 2 kilowatts to about 8 kilowatts.

19. The system of claim 8, wherein the at least one electron beam has an accelerated voltage of about 60 kilovolts to about 120 kilovolts and has a beam power in a range of about 2 kilowatts to about 8 kilowatts.

20. The method of claim 15, wherein the at least one electron beam has an accelerated voltage of about 60 kilovolts to about 120 kilovolts and has a beam power in a range of about 2 kilowatts to about 8 kilowatts.

* * * * *